United States Patent [19]

Konno

[11] Patent Number: 4,693,578

[45] Date of Patent: Sep. 15, 1987

[54] MOTORIZED WINDING AND REWINDING CAMERA

[75] Inventor: Tatsuo Konno, Kanagawa, Japan

[73] Assignee: Canon Kabushiki Kaisha, Tokyo, Japan

[21] Appl. No.: 839,468

[22] Filed: Mar. 12, 1986

Related U.S. Application Data

[63] Continuation of Ser. No. 576,857, Feb. 3, 1984, abandoned.

[30] Foreign Application Priority Data

Feb. 5, 1983 [JP] Japan .................................. 58-17766

[51] Int. Cl.[4] .............................................. G03B 1/18
[52] U.S. Cl. ................................ 354/173.1; 354/213; 354/214
[58] Field of Search ................ 354/173.1, 173.11, 213, 354/214

[56] References Cited

U.S. PATENT DOCUMENTS

| | | | |
|---|---|---|---|
| 4,482,226 | 11/1984 | Tamamura | 354/173.1 |
| 4,494,842 | 1/1985 | Kimura et al. | 354/173.11 |
| 4,611,896 | 9/1986 | Iwashita | 354/214 |

Primary Examiner—L. T. Hix
Assistant Examiner—David M. Gray
Attorney, Agent, or Firm—Toren, McGeady & Associates

[57] ABSTRACT

A camera having a first driving torque transmission for winding a film strip and a second driving torque transmission for rewinding the film strip with changeover means for selectively connecting the output of an electric motor to the first and second transmissions to effect automatic winding and rewinding. The motor in operative connection with the second transmission after being switched from an initial position where it is connected to the first transmission is automatically returned to the initial position when the film rewinding is completed.

10 Claims, 6 Drawing Figures

MOTORIZED WINDING AND REWINDING CAMERA

This is a continuation, of application Ser. No. 576,857, filed Feb. 3, 1984 now abandoned.

BACKGROUND OF THE INVENTION

1. Field of the Invention

This invention relates to motorized winding and rewinding cameras in which a roll of film is wound and rewound by a built-in motor.

More particuarly it relates to a camera in which the buit-in motor is brought into operative connection with a driving torque transmission for winding the film in automatic response to completion of film rewinding.

2. Description of the Prior Art

Recently, "full automation" has occurred particularly in the field of leaf shutter type (medium priced) cameras, and this trend is spreading to the field of single lens reflex cameras. The term "full automation" as herein used implies that as is well known, not only the exposure operation as a matter of course, but also all other operations including film winding and focusing and further even the film rewinding in sequence to the finish of film feeding, are automatically carried out by the electric motor incorporated in the camera housing, thus freeing the photographer from the distraction of carrying out a troublesome sequence of operations so as to enable the achievement of good photographs. Of the above-described various operations, with regard film rewinding automatization, certain points enumerated below must be taken into account particuarly in a camera in which the electrical circuitry and mechanisms are so designed that after the last available film frame has been exposed, the photographer needs to manually perform switching from the winding to the rewinding mode by an actuator accessible from the outside of the camera;

(1) The actuator must be provided with a foolproof means for preventing an unintentional operation of the actuator before the roll of film is all exposed; and (2) If the photographer forgets to return the actuator to the initial or "winding" position after the exposed roll of film had been rewound and the film cartridge is unloaded, the camera after having been loaded with a new cartridge will not advance the film when the shutter button returns from the depressed position. Such a situation has sometimes been taken as an indication that the camera is broken.

With regard to the above-described first point (1), it has been known in the prior art to provide for the rewind control member with a cover or a lock mechanism. Another way is to construct the rewind control actuator in two parts which have to be operated in sequence. At any rate, principally the prior art when effecting switching to the rewinding mode there are involved two or more steps of operation.

To solve the problem described in connection with the second point (2) mentioned above, the following different methods have been employed:

(a) The rewind control actuator is biased by a spring so that the photographer is required to retain the actuator in the rewinding position against the spring all the while the rewinding goes on. Upon knowledge of the finish of rewinding by means of a change of the motor sound, or by an exterior monitor which blinks so long as the film moves, the photographer will then remove his finger from depressing the actuator, whereby the actuator is automatically returned to the initial or winding position.

(b) Since continuous holding of the rewind control actuator with the finger is quite laborious, in accordance with another method the actuator after having been switched manually to the rewinding position is mechanically held in that position. When rewinding is completed, the motor is automatically stopped, and at the same time a visual or acoustic signal in the form of a light from an exterior indicator lamp or a sound from buzzer is emitted rewinding the photographer to return the actuator to the initial or winding position.

(c) in accordance with another method, unloading of the camera is mechanically hindered in such a manner that the back cover cannot be opened, or the exposed film cartridge cannot be taken out of the chamber in the camera, until the photographer resets the rewind control member to the winding position.

All of these prior art methods, however, require the photographer either to manipulate or to watch some of the operating members on the camera. In the present state of art, therefore, the photographer cannot relax his hands after the camera has been switched to the rewinding position until a new film cartridge is properly loaded and the camera operates in the winding mode. This can hardly be said in a true sense to be automatic rewinding.

SUMMARY OF THE INVENTION

With the foregoing in mind, the present invention has for its general object to eliminate all the above-described drawbacks of the prior art and to provide a motorized winding and rewinding camera in which a driving torque transmitting system of the motor is returned to the film winding position in automatic response to completion of film rewinding Briefly, the present invention may be described as a motorized winding and rewinding camera comprising: winding means having a driving torque transmission for winding a roll of film; rewinding means having a driving torque transmission for rewinding the film; and electric motor operating as a torque source for said winding and said rewinding means; a changeover member for selectively connecting the output of said motor to either of the driving torque transmissions of said winding means and said rewinding means; an actuating member for carrying out a switching operation of said changeover means; detecting means for detecting when the film rewinding by said rewinding means is completed; and resetting means responsive to the output of said detecting means which represents the finish of the film rewinding for bringing the output of said motor into operative connection with the driving torque transmission of said winding means.

Other objects of the invention will become apparent from the following description of embodiments thereof taken in connection with the accompanying drawings.

Figure 1:
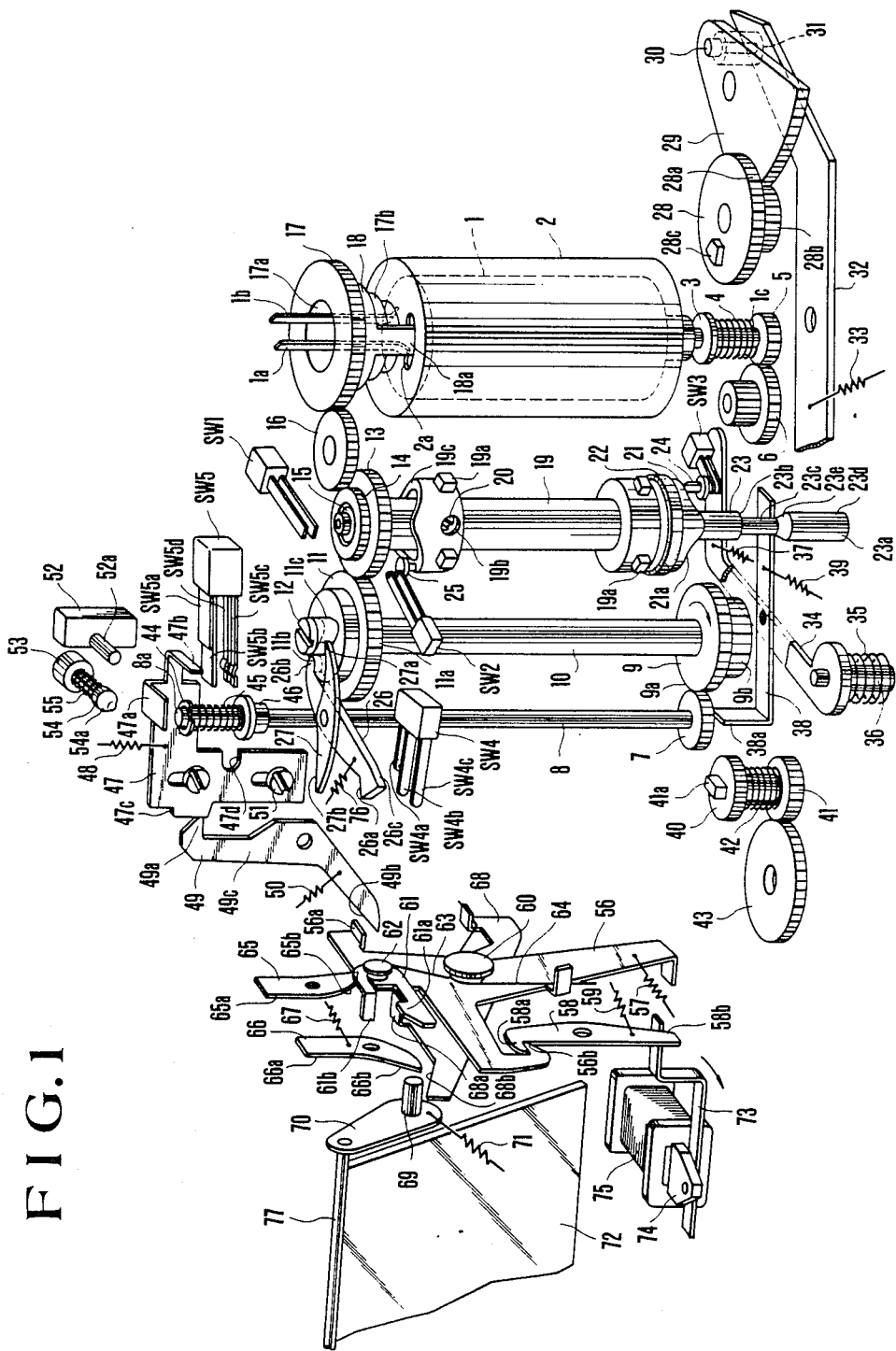
FIG. 1 is an exploded perspective view of an embodiment of motorized winding and rewinding mechanisms according to the present invention.

DETAILED DESCRIPTION OF THE PREFERRED EMBODIMENTS:

The present invention will next be described in connection with an embodiment thereof by reference to the drawings. In FIG. 1 there are shown interior mechanisms of the motorized winding and rewinding camera wherein 1 is an electric motor as a drive source for charging all portions of the camera, such as the film transportation mechanism, shutter and mirror. The motor 1 has electrical energy receiving terminals 1a and 1b, fixedly mounted on a base plate (not shown), and is contained within a film take-up spool 2. The film take-up spool 2 is rotatably supported by the base plate and has a hole 2a in which is engaged a leg 18a of a spool friction spring 18. A pinion 5 is rotatably mounted on an output shaft of motor 1. By a slip mechanism comprising a coil spring 4 and a collar 3, the driving torque of motor 1 is normally transmitted to the pinion 5. A speed reduction gear train has a first gear 6 meshing with the pinion 5 and a last gear 7 which is arranged to mesh with a gear assembly 9 at a larger gear 9a when in the winding mode, and to mesh with an absorption gear 40 when in the rewinding mode. The winding gear assembly 9 has another or smaller gear 9b meshing with a larger gear 28a of another gear assembly 28, and is fixed to a winding shaft 10. A one-frame indexing member 11 comprises a gear 11a meshing with a gear 13, a detent slot 11b cooperative with a pawl 26b of an arresting lever 26, and a camming portion 11c engageable with one end of a mirror release lever 27, and is fixedly secured to the winding shaft 10 by a screw fastener 12.

The aforesaid gear 13 is arranged to rotate as a unit with a sprocket shaft 23. A gear 14 is rotatably mounted on the sprocket gear 23 and constitutes along with a frictional disc 15 fixedly mounted on the top end of sprocket shaft 23, a clutch mechanism for establishing and cutting off transmission of motion of the sprocket shaft 23 to and from an idler gear 16. A spool gear 17 meshes with the idler gear 16 and is rotatably supported through a hollow shaft 80 fitted in a central hole 17a thereof. On the outer surface of a diameter-reduced portion 17b thereof there is convoluted the spring 18. The spool gear 17, spool friction spring 18 and film take-up spool 2 constitute a slip mechanism known to those skilled in the art operating when in the winding mode.

Figure 2:
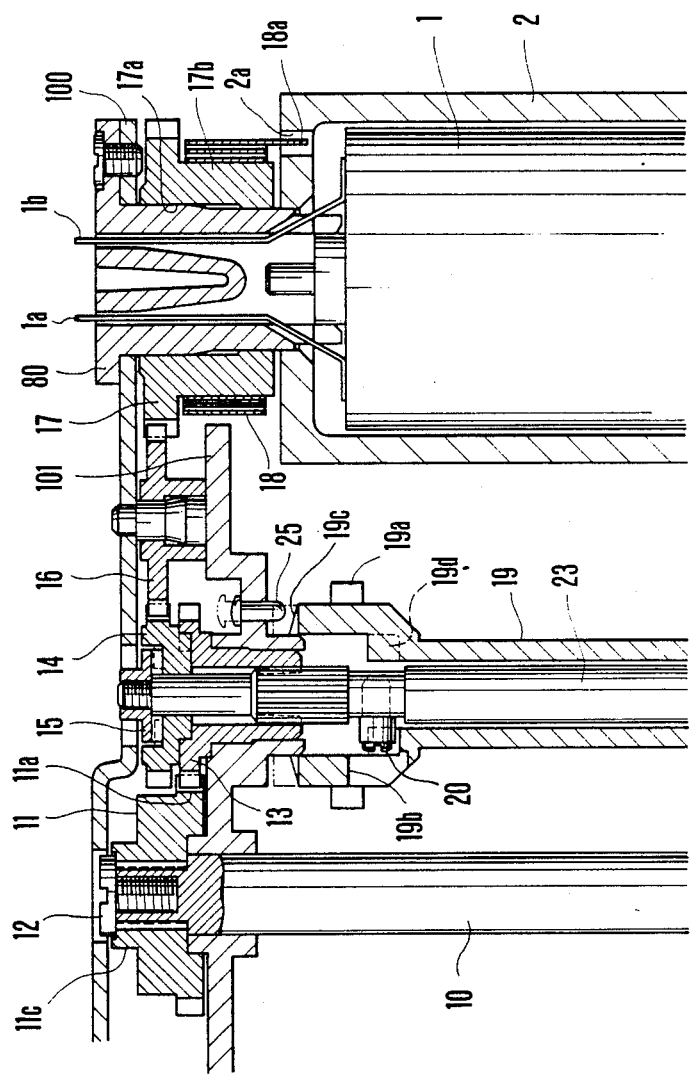
FIG. 2 is a fragmentary sectional view of the main parts of FIG. 1.

A sprocket 19 has teeth 19a engaging perforations of a film strip, and an escape hole 19b for a cluth screw 20, and is provided with a groove 19d (FIG. 2) engageable with said cluth screw 20. The parts 19b, 19d and 20 constitute a known cluth mechanism for establishing or cutting off transmission of rotation of said sprocket shaft 23 to and from the sprocket 19 as the sprocket shaft 23 moves upward or downward. The upper edge of the sprocket 19 is formed to a wavy camming surface 19c on which a cam follower pin 25 rides. A roller 21 fixedly carries a rubber ring 22 on the outer peripheral surface thereof and has its lower edge formed to a similar wavy camming surface 21a to the aforesaid camming surface 19c. On the camming surface 21a rides a cam follower pin 24. The roller 21 is rotatably supported on the base plate and is driven to rotate by the transporting film as it is pressed against the rubber ring 22, so that the roller 21 rotates only when the film is being transported.

The aforesaid sprocket shaft 23 is always urged downward by a coil spring (not shown), and is vertically slidable. When a rewind control knob contiguous to the shaft 23 is pushed upward, a lock lever 34 enters a radial recess 23b to hold the sprocket shaft 23 in the pushed position, and at the same time, the clutch screw 20 moves upward away from the groove 19d, whereby the aforesaid cluth mechanism is operated to leave the sprocket 19 freely rotatable. Further the clutch member 15 is also lifted upward, whereby the motion transmission to the idler gear 16 is cut off, and a switch SW1 is closed. The aforesaid cam follower 24 is supported on the base plate to be vertically slidable and abuts on the camming surface 21a so that as the roller rotates, the cam follower pin 24 reciprocates vertically, causing a switch SW3 to repeat cycles of opening and closing operation.

The second cam follower pin 25 is also supported on the base plate to be vertically slidable and abuts on the camming surface 19c of the sprocket 19, so that as the sprocket 19 rotates, the pin 25 reciprocates vertically, causing another switch SW2 to repeat cycles of opening and closing operation.

The winding stop lever 26 has a portion 26a for engagement with one end 66a of a lever 66, another portion 26b for engagement with the detent slot 11b of the gear 11a, and still another portion 26c for engagement with a movable contact SW4b of a switch SW, and is urged by a spring 76 to turn clockwise as viewed in FIG. 1. Since the winding stop gear 11a rotates 360° for each film frame, the film is admitted to advance through the prescribed length of one frame each time the pawl 26b is retracted from and then enters into the detent slot 11b.

A mirror release signal lever 27 is abuttingly engageable at its one end 27a with the cam 11c and at the opposite end thereof with one end 6a of a lever 65. In the early stage of winding operation, or just after the gear 11a starts to rotate clockwise, the cam 11c turns the mirror release signal lever 27 clockwise, until its tail 27b strikes the lever 65 at one end 65a thereof.

A gear 28 comprises a large geared portron 28a meshing with the small geared portion 9b of the winding gear 9 and a small geared portion 28b meshing with a sector gear 29 so that when the winding gear 9 has rotated 360°, the sector gear 29 is charged by a prescribed angle. Then, because a few teeth of the large geared portion of the aforesaid winding gear 9 are cut out, the meshing relation is broken and the sector gear 29 returns to its initial position when a charge lever 32 to be described hereinafter turns counterclokwise to regain its initial position. Also since the gear 28 has a protuberance 28c on the upper surface thereof at such a location that when the sprocket shaft 23 is pushed upward, the lock lever 34 is moved away from the radial recess 23c as the gear 28 returns to the initial position. Thus, the rewind control knob 23a is released from the advanced position.

The sector gear 29 fixedly carries a post 30 on which is rotatably mounted a roller 31. The charge lever 32 is urged by a spring 33 to turn counterclockwise and always abuts on the charge roller 31, so that when the sector gear 29 turns, the charge lever 32 is turned a prescribed angle. During this time, a charge system on a front panel (not shown) is charged by an oppisite end (not shown) of the charge lever 32. After that, it returns to the initial position.

The lock lever 34 is rotatably mounted on a shaft 36, and is supported to be vertically slidable. A coil spring 35 urges the lock lever 34 upward, and another spring 37 urges it to turn clockwise. And, in a normal position (illustrated position), the lock lever 34 is so high as to lie out of the path of the protuberance 28c of the gear 28. But when the sprocket shaft 23 is lifted upward, and the shoulder 23b is overlaid on the lock lever 34, it results that because a spring (not shown) urging the sprocket shaft 23 downward is stronger than the coil spring 35, the lock lever 34 is moved downward against the spring 35 to so lower a position as to be engageable with the protuberance 28c.

A lever 38 is urged by a spring 39 clockwise to abut with its one end on the diameter-reduced portion 23c of the sprocket shaft 23, and has its opposite end bent off upward to bar the changeover gear 7 from moving downward. When the above-described sprocket shaft 23 is pushed upward, as the diameter-reduced portion 23 moves away from the lever 38 and a tapered surface 23e followed by a large diameter portion 23d moves in, the lever 38 turns counterclockwise and its upward extension 38a moves away from the path of movement of the changeover gear 7.

The absorption gear 40 is non-rotatably but axially slidably mounted on a shaft 41a of a gear 41 and is urged by a spring 42 upward. When in a winding position (illustrated position), this absorption gear 40 does not mesh with any gear. But when switched to the rewinding mode, the changeover gear 7 is brought into engagement with the absorption gear 40 so that motion of gear 40 is transmitted to a first gear 43 of a rewinding gear train. A changeover shaft 8 is rotatably and slidably supported by a bearing 46 fixedly secured to a camera housing (not shown) and is urged by a spring 45 reacting with a retainer 44 to move upward.

A slider plate 47 is vertically movably mounted on a base plate (not shown) by stepped screw fasteners 51, and is urged by a spring 48 upward. When in the rewinding mode, the slider plate 47 has a bent portion 47a contacting with a head 8a of the aforesaid changeover shaft 8, another bent portion 47b acting on a movable contact SW5b of a switch SW5, an extension 47c engaging with a pawl 49a of a latch lever 49, and a cutout 47d accepting a pin 52a of an operating knob 52 accessible from the outside of the camera when switching to the rewinding mode is performed.

The latch lever 49 is urged by a spring 50 to turn clockwise and has a portion 49a for catching the slide plate 47, another portion 49b for engagement with a bent portion 56a of a mirror drive lever 56, and still another portion 49c for engagement with a cone dowel 54. The aforesaid cone dowel 54 is threadedly mounted on an external actuator button 53 for manually stopping the rewinding operation. When this actuator button 53 is pushed inward from the outside, the taper surface 54 of the cone dowel 54 acts on the side edge 49c of the aforesaid latch lever 49 and then turns the latter counterclockwise, whereby the slide plate 47 is released from latching connection. A spring 55 urges the aforesaid actuator button 53 to return to the initial position.

The mirror drive lever 56 has a bent portion 56a for engagement with the one end 49b of the latch lever 49, and a pawl 56b for engagement with a pawl of a lever 58, and is urged by a drive spring 57 to turn about a shaft 60 clockwise. A lever 61 is rotatably mounted at a shaft 62 on the aforesaid drive lever 56, and, is urged by a spring 63 to turn clockwise. The lever 61 has a pawl 61a for engagement with the pawl 68a of the mirror control lever 68 and an extension 61b engageable with one end 65a of a lever 65. The aforesaid mirror control lever 68 is rotatably mounted on the common shaft 60 of the mirror drive lever 56 and is urged by a spring 64 to turn counterclockwise relative to the mirror drive lever 56. The mirror control lever 68 has a portion 68b bearing a stud bolt 69 on the free end of a lever 70 with a shaft as a journal 77 for the mirror 72, so that when the lever 68 turns clockwise, the lever 70 is turned about the journal 77 against a spring 71 to move the mirror 72 to a prescribed non-viewing position. Such clockwise movement of mirror control lever 68 also causes a lever 66 to be turned counterclockwise against a spring 67 with an end 66a thereof engaging with the portion 68b, which in turn causes counterclockwise movement of the winding stop lever 26 to disengage its pawl 26b from the detent recess 11b.

The lever 58 is urged by a spring 58 counterclockwise to abut with its tail 58b on a free end of a lever 73. Mounted on the aforesaid lever 73 is an armature 74 cooperating with an electromagnet 75 of PM type. When a solenoid of the magnet 75 is supplied with current in response to actuation of a camera release, the armature 74 is moved away from the magnet 75. The mirror 72 is a known reflection mirror, in a viewing position, for directing the light coming from the objective lens to a finder optical system. When to make an exposure, the mirror 72 is flipped upward about the shaft 77 to clear the light path to the film. The embodiment of the invention has such mechanical features, and operates as follows: The mechanisms of FIG. 1 are assumed to be in the cocked position. When a camera release is actuated, the magnet 75 is first energized to release the armature 74 from attraction. The lever 73 is then turned in a direction indicated by arrow by the bias force of a spring (not shown), thereby the lever 58 is turned clockwise against the spring 59. Therefore, the latch pawl 58a disengages from the mirror drive lever 56, permitting the latter to turn clockwise by the force of the power storage spring 57. Since, at this time, the mirror control lever 68 is in operative connection with the mirror drive lever 56 by the lever 61, the mirror control lever 68 as a unit with the mirror drive lever 56 turns in the same direction. Therefore, the mirror arm 70 is turned counterclockwise, moving upward the mirror 72 from the viewing to the non-viewing position. Such clockwise movement of the mirror drive lever 68 also causes counterclockwise movement of the lever 66 against the spring 67 which in turn causes counterclockwise movement of the winding stop lever 26. Thus, the film advance control gear 11 is released from locking connection.

Responsive to this release operation, the switch contact SW4b is taken out of engagement with another contact SW4a and is brought into engagement with a third contact SW4c. This is followed by a shutter operation.

When an exposure is completed, the motor 1 is supplied with current and starts to rotate. Motion of the motor 1 is transmitted through the pinion 5 and the reduction gear train of the first gear 6 and the last gear 7 to the winding gear 9, and therefrom transmitted to both of the winding stop gear 11 and gear 28. Rotation of the winding stop gear 11 is transmitted through the gear 13 to drive rotation of sprocket 19 and also to the gear 14 of which rotation is transmitted through the gear 16 and spool gear 17 to drive rotation of the film take-up spool 2. Thereby the film is advanced through the prescribed length of one frame. It is during this time that the rubber ring 22 frictionally contacting with the film rotates the roller 21 so that the switch SW3 is turned on and off repeatedly by the actuator in the form of the cam follower pin 24 engaging on the wavy camming surface 21a. The output signal of the switch SW3 is applied to a display either in the field of view of the finder, or on the camera housing, informing the photographer of the fact that the film is in progress.

Also in the early stage of one revolution of the gear 11, the cam 11c turns the mirror release lever 27 clockwise until its opposite arm 27b strikes the lever 65 at the head 65a thereof. Then the lever 65 turns clockwise, causing the drive connection lever 61 to turn counterclockwise against the spring 63 until its pawl 61a disengages from the extension 68a of the mirror control lever 68. Then the lever 68 is turned counterclockwise by the force of the spring 64, allowing the mirror 72 to return to the initial or viewing position.

On the other hand, rotation of gear 28 is transmitted through the sector gear 29 to turn the charge lever 32 clockwise through a predetermined angle against the spring 33, whereby those of the mechanisms which lie on he front side of the base plate for example, a mirror quick return, AE, automatic diaphragm, are charged. As the winding operation goes on, when the gear 9 has rotated one revolution or 360°, the detent slot 11b comes into alignment with the pawl 26b of the winding stop lever 26. Then, as the pawl 26b drops into the slot 11b, the winding stop lever 26 turns clockwise, whereby the movable contact SW4b is moved from its SW4c to its SW4a position where the motor 1 is stopped. Thus, the winding operation is terminated and the mechanisms regain the illustrated positions.

As such operation has been recyled a number of times, for example, 36 times, no more fresh area of the film is available. In the last cycle of winding operation, it is rare that the illustrated or fully wound-up position is reached, but it often results that a film resistance takes place, and therefore that the winding charge system all stops on the way before the illustrated position is reached. Also at this time the slip mechanism comprising the retainer 3, spring 4 and gear 5 allows the motor 1 alone to continue rotating. On this account, a current supply control circuit for the motor 1 is so constructed that an occurrence of the film resistance is detected when the movable contact SW4b remains in contact with the SW4c for a prescribed time, for example, 1 second after the initiation of current supply to the motor 1. By this means the motor 1 is soon stopped automatically.

To accomplish the rewinding operation, the operator will first push the exterior portion, or rewind control knob, of the sprocket shaft 23. Then the lock lever 34 catches the shoulder 23b and holds the sprocket shaft 23 in the lifted position. It is in this position that as has been described before, the first clutch comprising the screw 20 and groove 19d in the interior of the sprocket 19 and the second clutch of the gear 14 and member 15 are cut off, leaving the sprocket 19 and film take-up spool 2 freely rotatable.

Such upward movement of the sprocket shaft 23 also causes closure of the switch SW1. If, at this time, the camera is not in completion of the last cycle of winding operation, it results that because the contacts SW4b and SW4c are ON, on the basis of this signal, the current supply to the motor 1 is caused to proceed by the closure of the aforesaid switch SW1 until the winding charge system and the front charge system are reset in the illustrated positions.

By the upward movement of the sprocket shaft 23, the lock lever 38 is turned counterclockwise against the spring 39 to move away from the path of movement of the changeover gear 7. Subsequent to the first touch of pushing the sprocket shaft 23 upward, the operator will then push down the rewind changeover knob 52, thereby the slide plate 47 is moved downward against the spring 48 along with the changeover shaft 8. Such movement of the slide plate 47 causes the movable contact SW5b to be taken out of engagement with the contact SW5a and to be brought into engagement with both of the contacts SW5c and SW5d. The latch lever 49 then holds the slide plate 47 in that operative position. It is in this position that the changeover gear 7 is out of mesh with the winding gear 9 but in mesh with the absorption gear 40 so that rotation is directed to the first gear 43 of the rewinding gear train.

When the contact SW4b moves from the SW4a to SW4c (SW4d) position, the motor 1 starts to rotate. Motion of the motor 1 is transmitted through the above-described reduction gear train and changeover gear 7 to the rewinding gear train, initiating a rewinding operation. As the film is moving backward while its perforations engaging the sprocket teeth 19a, the sprocket 19 is caused to rotate simultaneously. Therefore, the pin 25 moves up and down along the camming surface 19c, by which the switch SW2 is opened and closed repeatedly. Responsive to this output signal of switch SW2, the above-described display device either inside of the finder or exterior of the camera housing is blinking so that the photographer is aware of the running condition of the film when in the rewinding mode.

When the film is moved away from the sprocket 19, the latter no longer rotates and the display device stops presentation of the information. Responsive to an electrical signal representing the termination of this opening and closing operation, (as detected, for example, by a timer TMO to be described later cooperating with an AND gate A11, or by an excess of a prescribed time for stoppage of the output of A11 from further change), the current supply control circuit energizes the magnet 75 to release the armature 74 from the locking connection therewith. Therefore, as has been described above, the spring-powered lever 56 turns clockwise until its extension 56a strikes the second latch lever 49 at its tail 49b. Then the lever 49 is turned counterclockwise against the spring 50, thereby the slide plate 47 is released from the latched position and is moved upward to the initial position by the force of the spring 48. As the changeover shaft 8 follows up the slide plate 47 under the action of the spring 45, the changeover gear 7 after having been taken out of mesh with the absorption gear 40 is brought into mesh with the winding gear 9 as illustrated in FIG. 1.

Such clockwise movement of the spring-powered lever 56 also causes, as has been described above, counterclockwise movement of the lever 66 which in turn causes removal of the winding stop lever 26 from the detent slot 11b and switching of the contact SW4b to the SW4c position. Since, at this time, the switch SW5 is in its SW5c (SW5d) position, the camera is wound up one cycle in vain. It is by this preliminary winding operation that the sprocket shaft 23 is released from the latching connection with the lock lever 34 by the charge lever 32 and returns to the initial position by the action of the coil spring (not shown).

Thus, rewinding of the film is automatically stopped, and the sprocket shaft 23 and the rewinding changeover member 52, or the two exterior rewind control members, are automatically reset. If the photographer desires to stop the rewinding operation on the way, for example, with the intention of leaving the film leader exposed out of the cartridge, he may only push the button 53. That is, upon depression of the button 53, the second latch lever 49 is turned counterclockwise by the tapered surface 54a engaging the portion 49c, and its pawl 49a is disengaged from the projection 47c, permitting the slide plate 47 to move upward to the initial position. Thus, the rewinding operation gets stopped from further progress.

Figures 3, 4A, 4B, 4C:
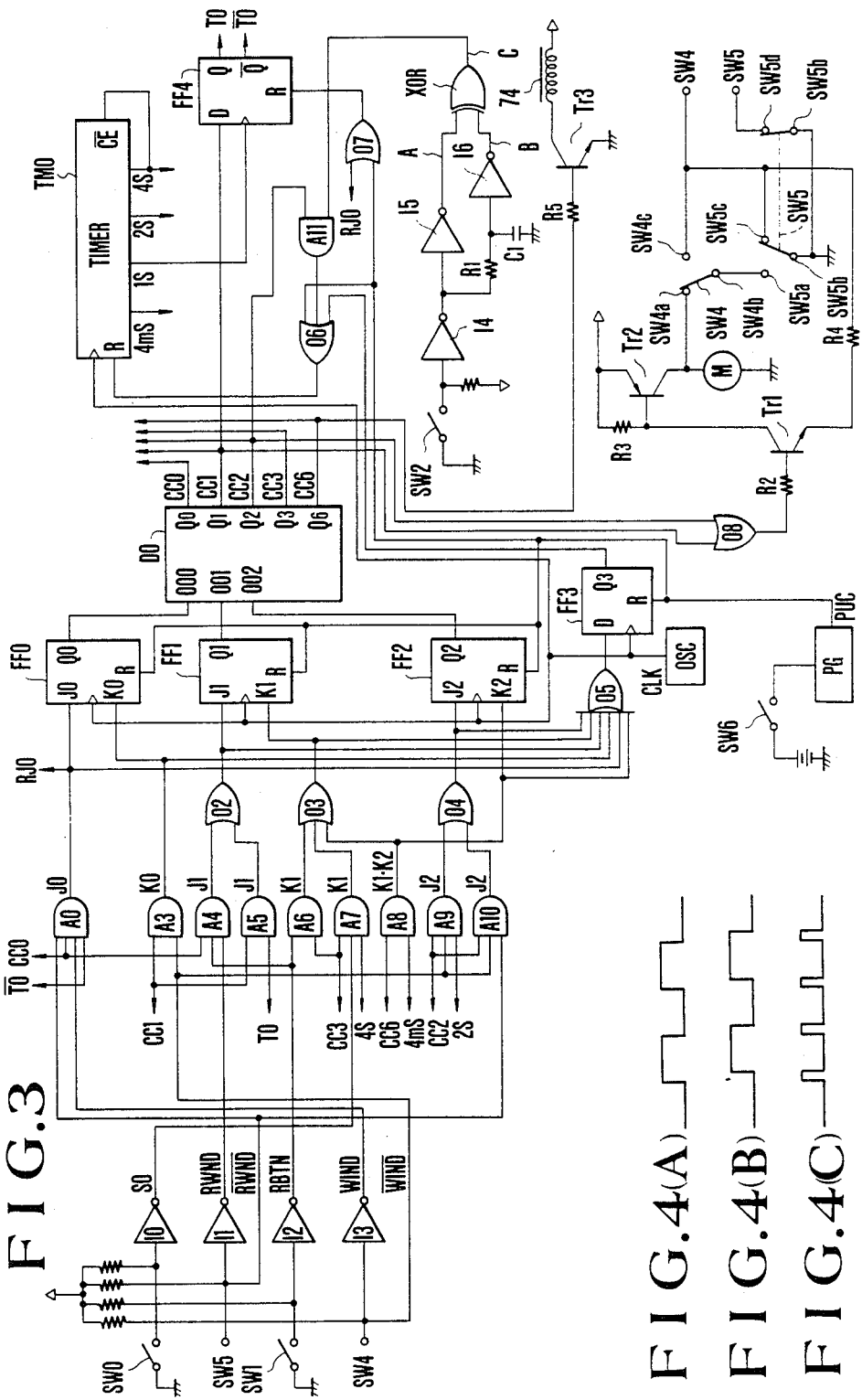
FIG. 3 is a diagram of a control circuit for the motorized winding and rewinding mechanisms.
FIGS. 4(a) are 4(b) and 4(c) are waveforms of signals appearing in the various portions circuit of FIG. 3.

In FIG. 3 there is shown a control circuit of the above-described motorized winding and rewinding mechanisms where A0 to A10 are AND gates; O2 to O8 are OR gates; I0 to I6 are inverters; FF0 to FF4 are flip-flops; XOR is an exclusive OR gate; D0 is a decoder; TM0 is a timer; OSC is an oscillator; SW0, SW1, SW2 and SW6 are opening and closing switches; SW4 and SW5 are changeover switches.

When the battery switch SW6 is turned on, a pulse generator PG produces an output signal PUC which is applied to reset flip-flops FF0 to FF3, through OR gate O6 to reset timer TM0 and through OR gate O7 to reset flip-flop FF4, so that the outputs Q1 to Q3 of flip-flops FF0 to FF3 become 0. Then decoder D0 produces an output of "1" at an stage Q0 which represents a sequence CC0. The camera is now assumed to be in the fully cocked position so that switch SW4 takes its SW4a position, and to be switched to the rewinding mode so that the switch SW5 takes its SW5c and SW5d positions and the switch SW1 is ON. Then inverters I1 and I2 with their inputs grounded produce outputs of "1"or signals labelled "BWND" and "RBTN" respectively. Responsive to these signals in addition to the CC0, AND gate A4 changes its output J1 to "1" which is applied through OR gate O2 to an input J1 of flip-flop FF1. Since flipflops FF0 and FF2 have inputs J0 and J2 respectively which are "0", the output Q1 of flip-flop FF1 changes to "1" in synchronism with the rising edge of a clock pulse from oscillator OSC. As others retain the receding state, decoder D0 have its inputs in a binary coded form of [010], and produces a signal of "1" at the output Q2 thereof. That is, the sequence becomes CC2. The output "1" of OR gate O2 is also applied through OR gate O5 to an input D of flip-flop FF3, thereby the output Q3 of flip-flop FF3 is changed to "1". This output Q3 is applied through OR gate O6 to reset timer TM0. When the sequence changes from CC0 to CC2, the output of AND gate A4 becomes "0". Therefore, the outputs of OR gates O2 and O5 become "0", and the input D of flip-flop FF3 becomes "0". In synchronism with the rising edge of the next clock pulse CLK, the output Q3 changes to "0". Thus, the flip-flop FF3 produces one "reset" pulse of the same duration as one clock pulse each time the sequence changes. This "reset" pulse is applied through OR gate O6 to reset the timer TM0.

The output CC2 enables AND gates A9, A10 and A11, and is applied through OR gate O8 and resistor R2 to turn on transistors Tr1 and Tr2, thereby motor M is energized.

The camera starts to rewind the film and at the same time the timer TM0 starts to count time. As rewinding of the film goes on, when the sprocket 19 rotates, the switch SW2 is turned on and off by the actuator 25 operating on the camming surface 19c. Each time the switch SW2 transits either ON to OFF, or OFF to ON, one pulse of short duration as shown in FIG. 4(c) is produced from a pulse forming circuit comprising the inverters I4 to I6, exclusive OR gate XOR, capacitor C1 and resistor R1. This pulse is applied through AND gate A11 and OR gate O6 to reset the timer TM0. Therefore, an output 2S of the timer TM0 remains "0" so long as the transit of the switch SW2 takes place in less than two seconds. As the film rewinding nears the end, after the film moves away from the sprocket teeth 19a, the switch SW2 is left unchanged from ON or OFF position. In two seconds from the termination of the operation of the switch SW2, the timer TM0 changes its output 2S to "1", causing the output of AND gate A9 to change to "1". Therefore, the output of OR gate O4, accordingly, an input J2 of the flip-flop FF2 becomes "1". In synchronism with the rising edge of a clock pulse CLK, the output Q2 of flip-flop FF2 is then changed to "1". Since, at this time, the other flip-flops FF0 and FF1 have their inputs J0, K0, K1 and J1 at "0", and their respective outputs Q0 and Q1, therefore, unchanged from the preceding conditions, or "0"and "1" respectively, the inputs of the decoder D0 takes another binary form of [110]. Thus, the sequence advances to CC6 so that the transistors Tr1 and Tr2 turn off to deenergize the motor M, terminating the film winding operation.

Such change of the sequence to CC6 also causes conduction of another transistor Tr3 which results in energization of the magnet 74. Then the mirror up mechanism operates to move the switch SW5 with its contact SW5b from the contacts SW5c and SW5d, but onto the opposite contact SW5a. Also as the mirror flips up, the switch SW4 is moved from its SW4a to its SW4c position.

In four seconds from the start of the sequence CC6, timer TM0 changes its output 4 ms to "1" causing the outputs of AND gates A8 and OR gate O3 to change to "1" successively. Therefore, the inputs K1 and K2 of flip-flops FF1 and FF2 become "1". In synchronism with the rising edge of a clock pulse CLK, all the outputs of flip-flops FF0 to FF2 return to "0". Responsive to this decoder D0 produces "1" at the output Q0. Thus, the sequence becomes CC0. Since, at this time, switch SW4 is ON, the output of inverter I3 is "1". Also since the switch SW5 is OFF, the signal $\overline{RWND}$ is "1". Also since flip-flop FF4 is in "reset" position, the output $\overline{Q}$ or signal $\overline{T0}$ is "1". Therefore, the output of AND gate A0 becomes "1", which is applied to the input J0 of flip-flop FF0. In synchronism with the rising edge of a clock pulse CLK, the flip-flop FF0 changes its output Q0 to "1". As the outputs of FF1 and FF2 are "0", the decoder D0 has its inputs in [001], and produces "1" at the output Q1 thereof, advancing the sequence to CC1. Thereby transistor Tr3 is turned off to deenergize the magnet 74. Such shift of the sequence also causes the output of OR gate O8 to change to "1". Because the SW5a and SW5b path and the SW4a and SW4b path are cut off, the transistors Tr1 and Tr2 are then turned on, to energize the motor M. Thus the camera starts to operate for one cycle of winding-in-vain operation.

When that cycle of winding operation is completed provided in, for example, one second, a subsequent operation proceeds as follows: At the termination of the winding operation, the contact SW4b is taken out of engagement with the contact SW4c, turning on with the opposite contact SW4a, whereby the transistors Tr1 and Tr2 are rendered non-conducting. Thus the motor M gets stopped, as the two ends of the winding of the motor M are short-circuited by grounding the aforesaid contact SW4a through the contact SW4b and the switch SW5. Also at the same time when the winding operation is terminated, the latch mechanism of the sprocket shaft 23 is released and the switch SW1 is turned off. Thus, the camera regains the initial position. And, such disengagement of the contact SW4b from the contact SW4c causes change of the signal $\overline{\text{WIND}}$ to "1" and therefore causes change of the output of AND gate A3, or the input K0 of flip-flop FF0, to "1". In synchronism with the rising edge of a clock pulse CLK, the flip-flop FF0 then changes its output Q0 to "0". Because of the flip-flops FF1 and FF2 having the outputs Q1 and Q2 of "0", the decoder D0 has its inputs in the form of [000] and produces "1" at the output Q0. Thus, the sequence returns to CC0.

Now assuming that when the phase of sequence is CC1, in other words, when the camera operates in the winding mode, the cycle of winding operation fails to complete itself in less than one second.

Similarly to the above, shifting of the sequence to CC1 results in starting a motorized winding. At the same time, the timer TM0 starts to count clock pulses CLK. When one second has passed, the output 1S changes to "1". This output is applied to a "clock" terminal C of flip-flop FF4, causing the output Q of flip-flop FF4 to change to "1". Therefore, the output of AND gate A5 becomes "1", and the output of OR gate O2 becomes "1". Responsive to this, flip-flop FF1 changes its output Q1 to "1" in synchronism with the rising edge of a clock pulse. Also the flip-flop FF0 has the output Q0 of "1", and the flip-flop FF2 has the output Q2 of "0". Therefore, the decoder D0 changes its output Q3 to "1", thus shifting the sequence to CC3 representing the fact that the cycle of winding operation is in unfinish as the film can be no more fed.

As soon as the sequence has shifted to CC3, the photographer becoming aware of this situation may get a release of the latch mechanism by means of the sprocket shaft 23. When the switch SW1 is turned on, the output RBTN of inverter I2 changes to "1", and therefore, the outputs of AND gate A6 and OR gate O3 change to "1" successively. Responsive to this, flip-flop FF1 changes its output Q1 to "0" in synchronism with the rising edge of a clock pulse CLK. Thus, the sequence is shifted backward to CC1 by the decoder D0, permitting the above-described last cycle of winding operation to proceed to completeness.

If the photographer is not aware of that situation, it will result that when the sequence CC3 has taken four seconds to operate, the timer TM0 changes its output 4S to "1" which is applied to its CE terminal, so that the counting operation stops to maintain the output 4S at "1". After that, when the photographer comes to notice it, he then needs to turn on a light metering switch SW0 (not shown), thereby the output of inverter I0 is changed to "1", and therefore, the outputs of AND gate A7 and OR gate O3 are changed to "1". Thus the sequence is shifted backward to CC1, permitting the winding operation to proceed.

This phase of sequence is provided for the purpose of reducing the overheat of the motor resulting from the prolonged energization under heavy load and increasing the lifespan of the motor by creating a suspension of operation for a period, for example, four seconds as in the illustrated embodiment. Also the battery itself is allowed to rest with another advantage that the electrical energy can be saved to a considerable amount. Since the actual voltage of the battery, too, can recover, it is made sure that the subsequent winding operation can also proceed satisfactorily. This becomes of great imporatance particularly when the ambient temperature is very low.

Though, in the illustrated embodiment, the means for detecting when the film is fully rewound is made in the form using the sprocket 19, it is also possible to employ other methods, for example, by detecting rotation of the roller 21, or by using the timed relationship with the null-setting of the film frame counter, or by these methods in combination.

As has been described above, the present invention provides a camera capable of automatically winding and rewinding a roll of film by an electric motor with automatic means responsive to detection of completion of exposure of a roll of film for terminating the rewinding operation, then changing over the drive connection of said motor to a driving torque transmission capable of a winding operation, and then returning a rewind control actuator automatically to the initial position, thus freeing the photographer from various inconvenient maneuvours concerning loading and unloading the camera such as the distraction of resetting said rewind control actuator. This can make a great contribution to advance automatization of cameras.

Another feature of the invention is that with the camera that has rested on the way to completion of the cycle of winding operation as it should be due to the film anchorage, when the rewind control actuator is pushed, the remaining part of the cycle of winding operation along with the related release changing is forcibly caused to proceed, whereby a leakage of light is prevented from reaching the film through the shutter which would be otherwise left open as the film is being rewound. This produces a great advantage particuarly when the present invention is applied to the type of camera having a built-in quick return mirror mechanism such as in single lens reflex cameras.

Still another feature of the invention is that the termination of the rewinding operation is affected forcibly followed by a release operation. by utilizing this operation, resetting of all portions of the camera is carried out as has been described above. This makes it possible to achieve the desired improvements without causing any increase in the bulk and size of the camera.

Also when the invention is embodied as illustrated by the drawings, there is produced another advantage that the rewinding operation can be interrupted at a desired point manually, because the slide plate 47 that functions to mechanically hold the rewinding state when in the latching connection with the lever 49 is arranged to be released from the latching connection by means accessible from the outside of the camera. While a specific embodiment of the invention has been shown and described in detail to illustrate the application of the inventive principles, it will be understood that the invention may be embodied otherwise without departing from such principles.

What I claim:
1. A motirized winding and rewinding camera comprising:

(a) winding means having a driving torque transmission for winding a film;
(b) rewinding means having a driving torque transmission for rewinding the film;
(c) an electric motor operating as a torque source for said winding means and said rewinding means;
(d) a changeover member for selectively connecting the output of said motor to the driving torque transmission of said winding means or said rewinding means;
(e) a lock member for locking said changeover member in the winding position;
(f) a first rewind control actuating member for operating said lock member to release;
(g) a second rewind control actuating member for operating said changeover member to change over;
(h) detecting means for detecting when film rewinding by said rewinding means is completed;
(i) controlling means responsive to the output of said detecting means which represents the fact that the film rewinding has been completed for changing over the driving torque transmission to the film winding state; and
(j) lock returning means for performing a locking operation on said changeover member by said lock member as said resetting means operates.

2. A camera according to claim 1, wherein said first rewind control actuating member when carrying out the release operation of said lock member renders freely rotatable a film moving member constituting part of the driving torque transmission of said winding means.

3. A camera according to claim 2, wherein said film moving member is in the form of a sprocket having teeth engaging the perforations of the film.

4. A camera according to claim 1, further comprising; a detecting switch for independently detecting occurrence of the release operation of said first rewind control actuating member.

5. A camera according to claim 1, further comprising: a detecting switch for independently detecting occurrence of the changeover operation oF said second rewind control actuating member.

6. A motorized winding and rewinding camera comprising:
(a) winding means having a driving torque transmission for winding a film;
(b) rewinding means having a driving torque transmission for rewinding the film;
(c) an electric motor operating as a torque source for said winding and said rewinding means;
(d) a changeover member for selectively connecting the output rotation of asid motor to either of the driving torque transmissions of said winding means and said rewinding means;
(e) rewinding completion detecting means for detecting when film rewinding by said rewinding means is completed;
(f) winding completion detecting means for examining whether the preceding winding operation by said winding means has advanced the film through the full length of one frame when said actuating member is operated to effect changing over to said rewinding transmission;
(g) proceeding means responsive to detection of the fact that the cycle of winding operation is not completed yet by said winding completion detecting means for forcibly carrying out the remaining part of the cycle of operation of said winding means so that the film is advanced exactly one frame; and
(h) releasing means for carrying out a release operation when said rewinding completion detecting means produces an output representing that film rewinding has been completed.

7. A motorized winding and rewinding camera with a built-in motor, comprising:
(a) winding means having a driving torque transmission for winding a film;
(b) rewinding means having a driving torque transmission for rewinding the film;
(c) an electric motor operating as a torque source for said winding and said rewinding means;
(d) a changeover member for selectively connecting the output rotation of said motor to either of the driving torque transmissions of said winding means and said rewinding means;
(e) detecting means for detecting when film rewinding by said rewinding means is completed; and
(f) controlling means for changing said changeover member to a film winding state when said detecting means detects the completion of film rewinding, said controlling means changing said changeover means by the rotation of said motor.

8. A camera according to claim 7, further comprising:
(a) releasing means for controlling the commencement of a shutter operation;
(b) a reflex mirror pivotably supported for movement to a viewing position and to a nonviewing position; and
(c) reflex mirror driving means for swinging said reflex mirror to the nonviewing position in response to the operation of said releasing means and restoring said reflex mirror to the viewing position after completion of an exposure operation of said camera.

9. A motorized winding and rewinding camera with a built-in motor, comprising:
(a) winding means having a driving torque transmission for winding a film;
(b) rewinding means having a driving torque transmission for rewinding the film;
(c) an electric motor operating as a torque source for said winding and said rewinding means;
(d) a changeover member for selectively connecting the output rotation of said motor to either of the driving torque transmissions of said winding means and said rewinding means;
(e) detecting means for detecting when film rewinding by said rewinding means is completed; and
(f) controlling means for changing said changeover actuating member to the film winding state when said detecting means detects completion of film rewinding, said controlling means changing said changeover means by the rotation of said motor.

10. A camera according to claim 9, further comprising:
(a) releasing means for controlling the commencement of a shutter operation;
(b) a reflex mirror pivotably supported for movement to a viewing position and to a nonviewing position; and
(c) reflex mirror driving means for swinging said reflex mirror to the nonviewing position in response to the operation of said releasing means and restoring said reflex mirror to the viewing position after completion of an exposure operation of said camera.

* * * * *